United States Patent
Griffin et al.

(10) Patent No.: US 9,072,052 B2
(45) Date of Patent: Jun. 30, 2015

(54) COMMUNICATION SYSTEM PROVIDING CONTEXT-BASED MOBILE WIRELESS COMMUNICATIONS DEVICE POWER CONSUMPTION MANAGEMENT AND RELATED METHODS

(75) Inventors: Jason Tyler Griffin, Kitchener (CA); Scott Douglas Rose, Waterloo (CA); Karim Gillani, Waterloo (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 569 days.

(21) Appl. No.: 12/852,846

(22) Filed: Aug. 9, 2010

(65) Prior Publication Data

US 2012/0034867 A1    Feb. 9, 2012

(51) Int. Cl.
*H04B 5/00*    (2006.01)
*H04W 52/02*    (2009.01)
*H04M 1/725*    (2006.01)

(52) U.S. Cl.
CPC ...... *H04W 52/0254* (2013.01); *H04M 1/72569* (2013.01); *H04M 2250/04* (2013.01); *H04M 2250/06* (2013.01)

(58) Field of Classification Search
CPC .................................................. H04M 1/72569
USPC .................... 455/41.1, 422, 469, 569
See application file for complete search history.

(56) References Cited

U.S. PATENT DOCUMENTS

| | | | |
|---|---|---|---|
| 6,961,594 B2 | 11/2005 | Rankin | 455/574 |
| 2003/0032460 A1* | 2/2003 | Cannon et al. | 455/569 |
| 2008/0009313 A1 | 1/2008 | Ishii | 455/556.1 |
| 2008/0068130 A1 | 3/2008 | Batta et al. | 340/10.1 |
| 2008/0160984 A1 | 7/2008 | Benes et al. | 455/419 |
| 2008/0192666 A1 | 8/2008 | Koskan et al. | 370/311 |
| 2008/0242372 A1 | 10/2008 | Schmidt et al. | 455/575.1 |
| 2009/0131074 A1 | 5/2009 | Minier | 455/456.1 |
| 2009/0287948 A1 | 11/2009 | Chary | |
| 2010/0099354 A1 | 4/2010 | Johnson | 455/41.1 |
| 2011/0070826 A1 | 3/2011 | Griffin et al. | |
| 2012/0040611 A1 | 2/2012 | Griffin et al. | |
| 2012/0094596 A1 | 4/2012 | Tysowski | |

OTHER PUBLICATIONS

Pering et al. "*CoolSpots: Reducing the Power Consumption of Wireless Mobile Devices with Multiple Radio Interfaces*" MobiSys'06, Jun. 19-22, 2006, Uppsala Sweden. ACM 1-59593-195-Mar. 6, 2006.

* cited by examiner

*Primary Examiner* — Hsin-Chun Liao
(74) *Attorney, Agent, or Firm* — Guntin & Gust, PLC; Andrew Gust (57) ABSTRACT

A communication system may include a plurality of near-field communication (NFC) sensors each associated with a respective location, and a mobile wireless communications device(s) switchable among a plurality of different power consumption modes. The mobile wireless communications device(s) may include a portable housing, an NFC circuit carried by the housing and configured to establish NFC communications with at least one of the NFC sensors when in proximity therewith, and a plurality of different wireless communications circuits carried by the housing. The mobile wireless communications device(s) may further include a controller carried by the housing and coupled to the NFC circuit and the different wireless communications circuits which may be configured to switch to a given power consumption mode based upon the at least one NFC sensor. In particular, some of the different power consumption modes may be associated with selectively powering respective ones of the wireless communications circuits.

24 Claims, 7 Drawing Sheets

COMMUNICATION SYSTEM PROVIDING CONTEXT-BASED MOBILE WIRELESS COMMUNICATIONS DEVICE POWER CONSUMPTION MANAGEMENT AND RELATED METHODS

TECHNICAL FIELD

This application relates to the field of communications, and more particularly, to mobile wireless communications devices and related methods that use near-field communication (NFC).

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the Internet via a cellular network and/or a wireless local area network (WLAN), for example.

Some mobile devices incorporate contactless card technology and/or near field communication (NFC) chips. NFC technology is used for contactless short-range communications based on radio frequency identification (RFID) standards, using magnetic field induction to enable communication between electronic devices, including mobile wireless communications devices. These short-range communications include payment and ticketing, electronic keys, identification, device set-up service and similar information sharing. This short-range high frequency wireless communications technology exchanges data between devices over a short distance, such as only a few centimeters.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Generally speaking, a communication system is disclosed herein which may include a plurality of near-field communication (NFC) sensors each associated with a respective location, and at least one mobile wireless communications device being switchable among a plurality of different power consumption modes. The at least one mobile wireless communications device may include a portable housing, an NFC circuit carried by the portable housing and configured to establish NFC communications with at least one of the plurality of NFC sensors when in proximity therewith, and a plurality of different wireless communications circuits carried by the portable housing. The mobile wireless device may further include a controller carried by the portable housing and coupled to the NFC circuit and the plurality of different wireless communications circuits which may be configured to switch to a given power consumption mode based upon the at least one NFC sensor. In particular, at least some of the different power consumption modes may be associated with selectively powering respective ones of the plurality of wireless communications circuits. As such, the at least one mobile wireless communications device may provide power saving features, for example, based upon the context or environment in which the device is operating.

By way of example, the plurality of different wireless communications circuits may comprise at least two of a satellite positioning system circuit, a cellular communication circuit, a wireless local area network (WLAN) circuit, and a Bluetooth circuit. In the case of a satellite positioning system circuit, where the location for the at least one NFC sensor is adjacent a building entrance, the controller may be configured to switch off powering of the satellite positioning system circuit, for example.

In accordance with another example where at least one of the plurality of wireless communications circuits comprises a cellular communication circuit, the location of the at least one NFC sensor may be adjacent a building entrance, and the controller may be configured to switch off powering the cellular communication circuit. In another example where at least one of the plurality of wireless communications circuits comprises a wireless local area network (WLAN) circuit and the location of the at least one NFC sensor is in a vehicle, the controller may be configured to switch off powering of the WLAN circuit. In still another example where at least one of the plurality of wireless communications circuits comprises a Bluetooth circuit and the location of the at least one NFC sensor is in a vehicle, the controller may be configured to switch on powering of the Bluetooth circuit.

Additionally, the at least one mobile wireless communications device may further include a display carried by the portable housing and coupled to the controller and having different illumination settings. As such, at least some of the different power consumption modes may be associated with selectively changing the different illumination settings of the display.

A related mobile wireless communications device, such as the one briefly described above, and method for switching power consumption modes of a mobile wireless communications device are also provided. The method may include switching the mobile wireless communications device to a given power consumption mode based upon the at least one NFC sensor, wherein at least some of the different power consumption modes are associated with selectively powering respective ones of the plurality of wireless communications circuits.

Figure 1:
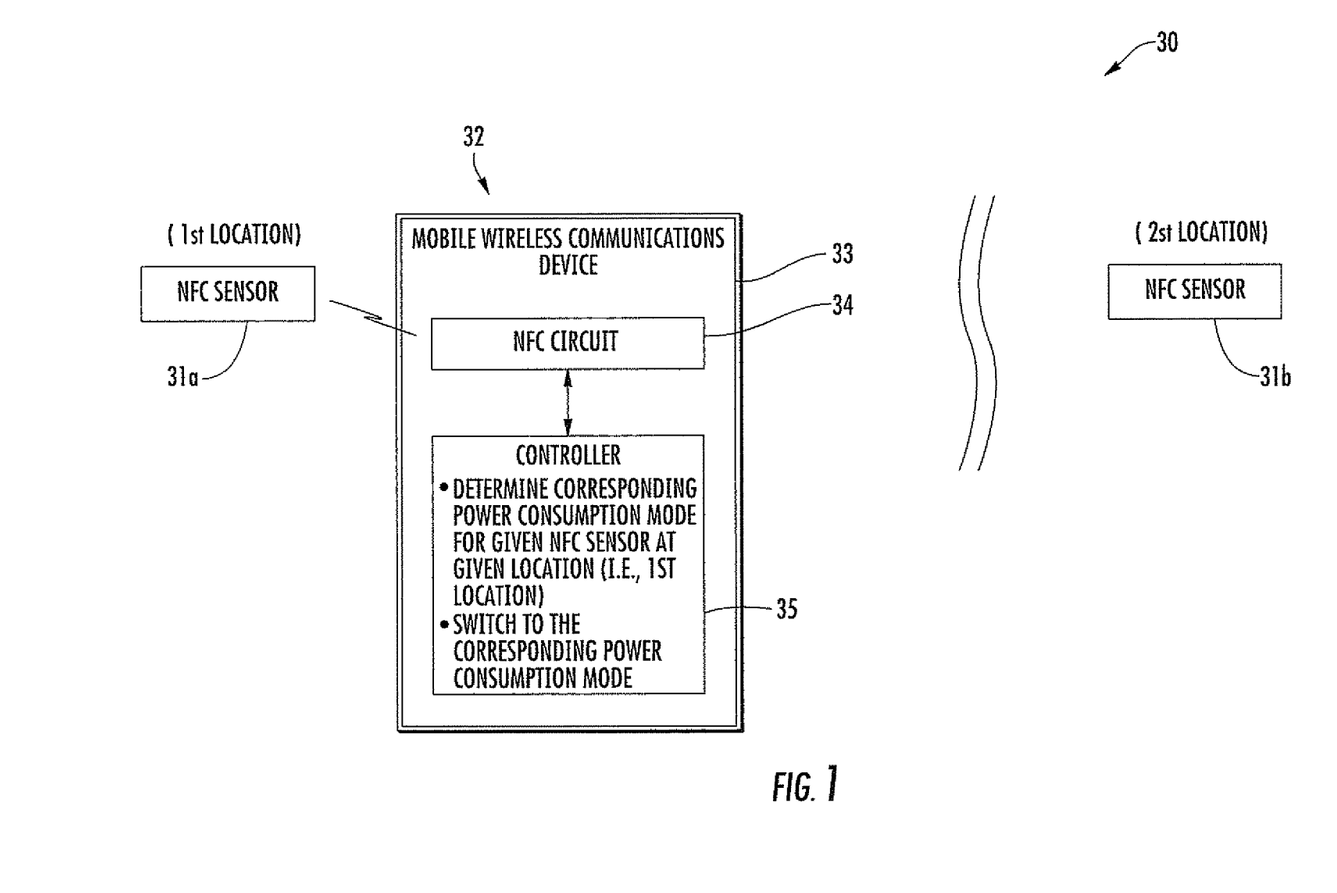
FIG. 1 is a schematic block diagram of a near field communication (NFC) system in accordance with an example embodiment.
Figure 6:
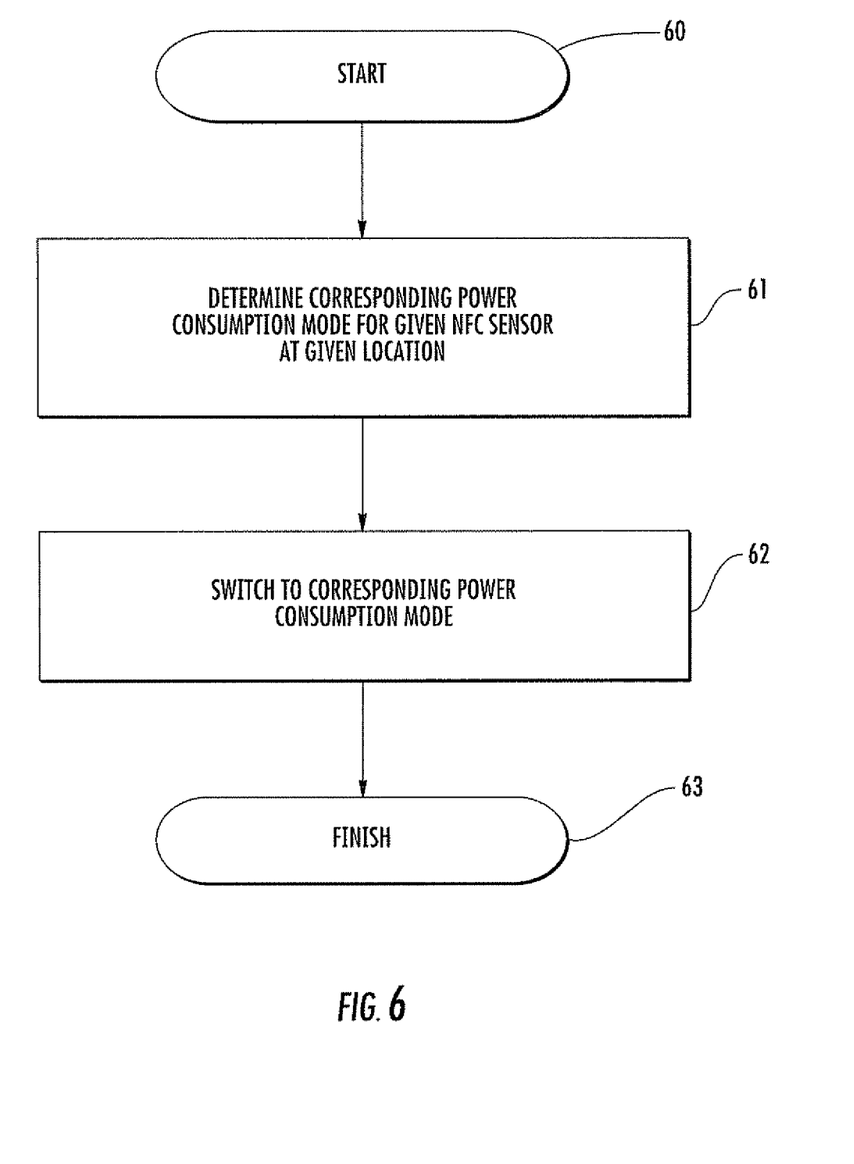
FIG. 6 is a flow diagram illustrating method aspects associated with the NFC system of FIG. 1.

Referring initially to FIGS. 1 and 6, an NFC system 30 and associated method aspects are first described. The NFC system 30 illustratively includes a plurality of NFC sensors 31a, 31b each associated with a respective location (here, the first and second locations). NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 10 cm, but other suitable versions of near-field communication which may have different operating frequencies, effective ranges, etc., for example, may also be used. The NFC sensors 31a, 31b may be passive tags or active readers depending upon the given implementation, as will be discussed further below. While two NFC sensors 31a, 31b are shown in the present example, other numbers of sensors may be used in different embodiments.

The NFC system 30 further illustratively includes one or more mobile wireless communications devices 32 (also referred to as "mobile devices" herein). Example mobile devices may include portable or personal media players (e.g., MP3 players, video players, etc.), remote controls (e.g., television or stereo remotes, etc.), portable gaming devices, portable or mobile telephones, smartphones, etc. The mobile device 32 illustratively includes a portable housing 33 and an NFC circuit 34 carried by the portable housing and being configured to establish NFC communications with a given one of the NFC sensors 31a, 31b when in close proximity therewith, as noted above. The mobile device 32 may further include additional wireless capabilities beyond NFC in some embodiments, as will be discussed further below, but this is not required in all embodiments.

The mobile device 32 further illustratively includes a controller 35 carried by the portable housing 33 and coupled to the NFC circuit 34. Beginning at Block 60, the controller 35 may be configured to determine a corresponding power consumption mode for a given NFC sensor (NFC sensor 31a in the illustrated example) based upon NFC communications therewith, at Block 61, and switch to the corresponding power consumption mode, at Block 62, thus concluding the method illustrated in FIG. 6 (Block 63). As such, the mobile device 32 may advantageously provide power saving features, for example, based upon the environment in which it is operating, as determined by the location of the given NFC sensor 31a.

Figure 2:
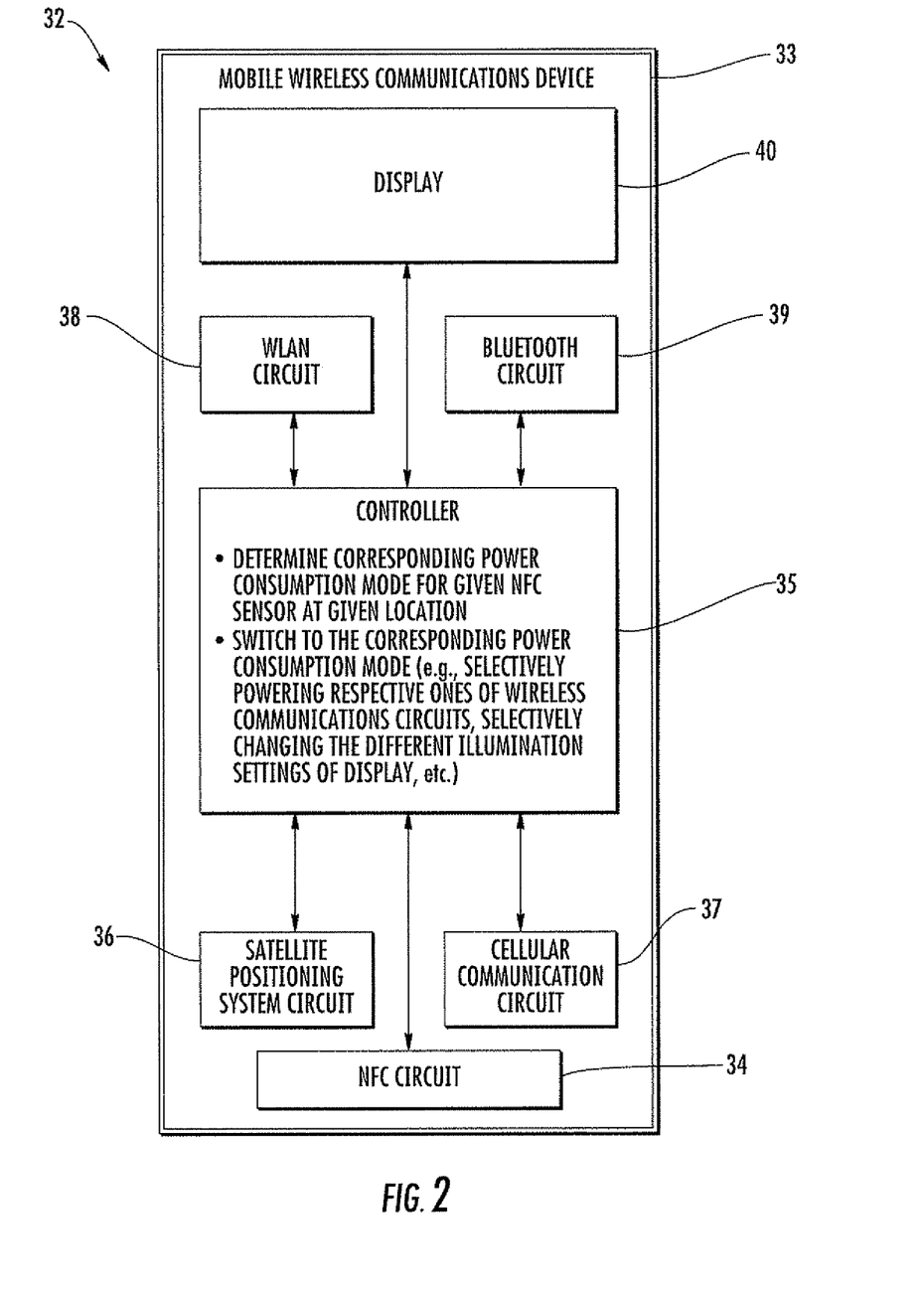
FIG. 2 is a schematic block diagram of an example embodiment of the mobile wireless communications device of the system of FIG. 1 shown in greater detail.

Referring more particularly to FIG. 2, an example embodiment of the mobile device 32 further illustratively includes a plurality of different wireless communications circuits coupled to the controller 35, namely a satellite positioning system circuit (e.g., receiver) 36 (e.g., GPS, GLONASS, GALILEO, etc.), a cellular communication circuit (e.g., transceiver) 37, a wireless local area network (WLAN) circuit (e.g., transceiver) 38 (e.g., 802.11x), and a Bluetooth circuit (e.g., transceiver) 39. The mobile device 32 also illustratively includes a display 40 coupled to the controller 35 and having different illumination settings (e.g., chrominance, luminance, etc.). For ease of illustration, the respective antennas for the different wireless communications circuits 36-39 are not shown in FIG. 2.

Figure 3:
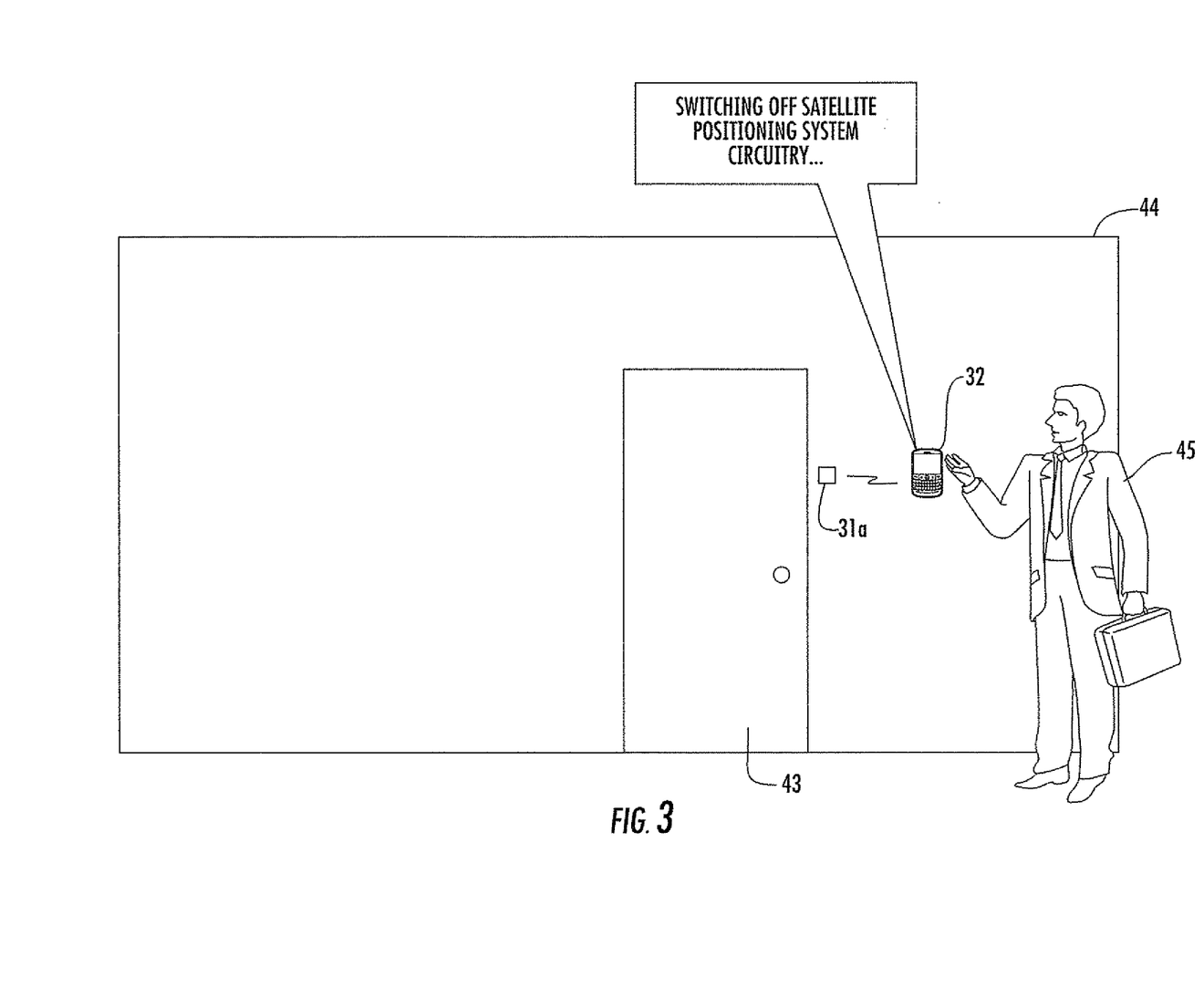
FIGS. 3 and 4 are schematic block diagrams illustrating use of the NFC system of FIG. 1 with respect to physical (i.e., building) access.

Accordingly, the different power consumption modes may be associated with selectively powering respective ones of the wireless communications circuits 36-39. Referring additionally to FIG. 3, in accordance with one example, the given NFC sensor 31a is positioned adjacent an entrance (e.g., door 43) of a building 44, such as to provide secured access to the building. When a user 45 swipes or otherwise moves the mobile device 32 in close proximity to the NFC sensor 31a, the controller 35 may be configured to switch off powering of the satellite positioning system circuit 36. That is, because it is known that swiping the NFC sensor 31a means that the user 45, and thus the mobile device 32, are entering the building 44, and this means that satellite positioning signals will likely be unavailable (due to building obstruction). In addition, the user may not need to monitor position information within the building.

As such, the power consumption mode may be set to switch off or otherwise disable the satellite positioning circuit 36 to advantageously save battery power, for example, because it is determined from the location of the NFC sensor 31a that satellite positioning will not be required for the near future. A notification may be provided on the display 40 that the satellite positioning system circuit 36 is being turned off, as shown in the illustrated example, but such notifications need not be provided in all embodiments. That is, the controller 35 may automatically switch to the appropriate power consumption mode without user notification. In other embodiments, the controller 35 may generate a prompt on the display 40 requiring acknowledgement or acceptance before switching to a given power consumption mode.

Figure 4:
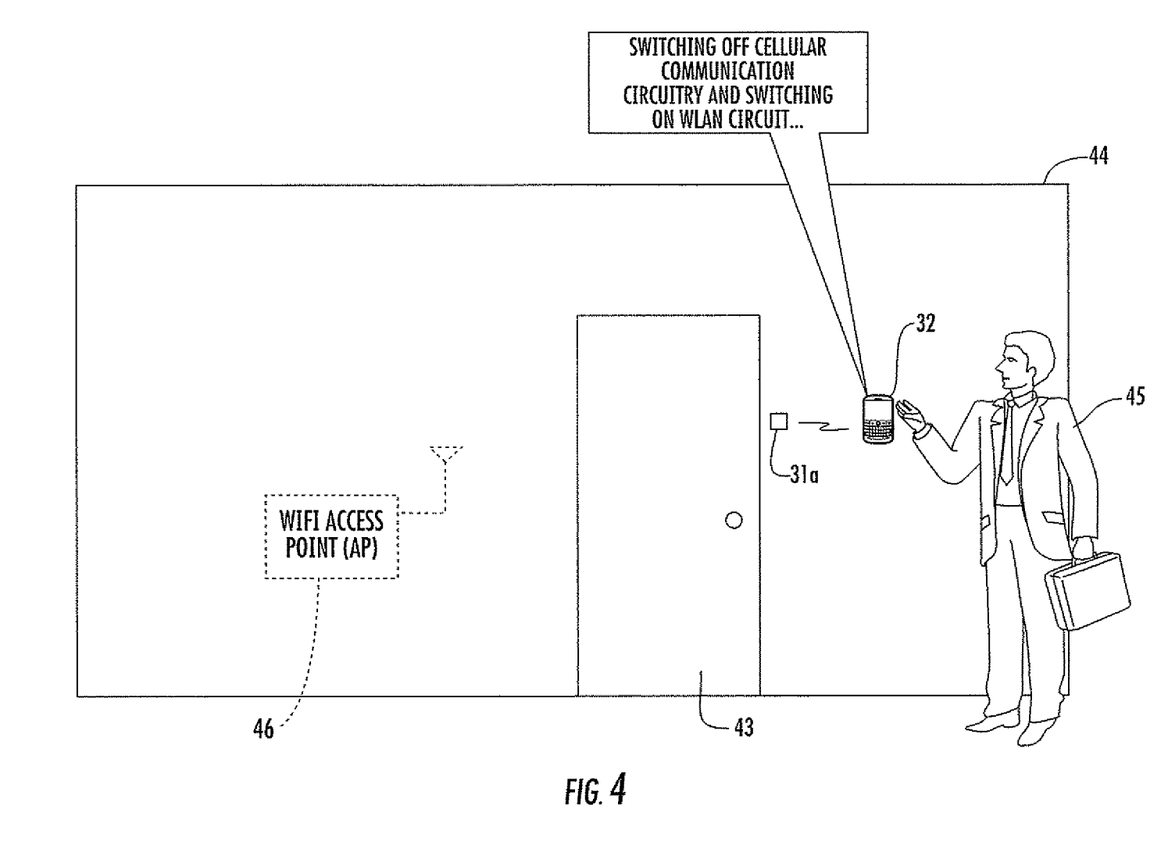

Another similar example is shown in FIG. 4. Within or adjacent the building 44 there is a WiFi access point 46 (e.g., 802.11x, etc.) which allows the mobile device 32 to switch over from cellular to WiFi communications for voice and data services. As such, when NFC communications with the NFC sensor 31 are established, the controller 35 determines that the mobile device 32 is within range of the WiFi AP 46, and thus the controller may be configured to switch off powering the cellular communication circuit 37. Again, this provides power savings based upon the current location of the mobile device 32 as determined by NFC communications with the known NFC sensor 31a.

The power consumption or savings modes may be programmed through a graphical interface application which is run by the controller 35 and shown on the display 40. For example, upon swiping anew NFC sensor 31, a prompt or menu may be given on the display 40 to provide desired settings with respect to the sensor. That is, the prompt may allow selection of whether one or more of the wireless communications circuits 36-39 should be switched on or off upon establishing NFC communications with the given NFC sensor 31, whether the display settings should be changed, etc., as will be discussed further below. Another approach is that the given NFC sensor 31 may provide instructions to the controller 35 regarding which power consumption mode to enter. For example, the NFC sensor 31 may be connected to a building controller (not shown) that informs the controller that WiFi is available in the building 44, so that the controller 35 may then switch off powering of the cellular communication circuit 37 and switch on powering of WLAN circuit 38, if appropriate.

Figure 5:
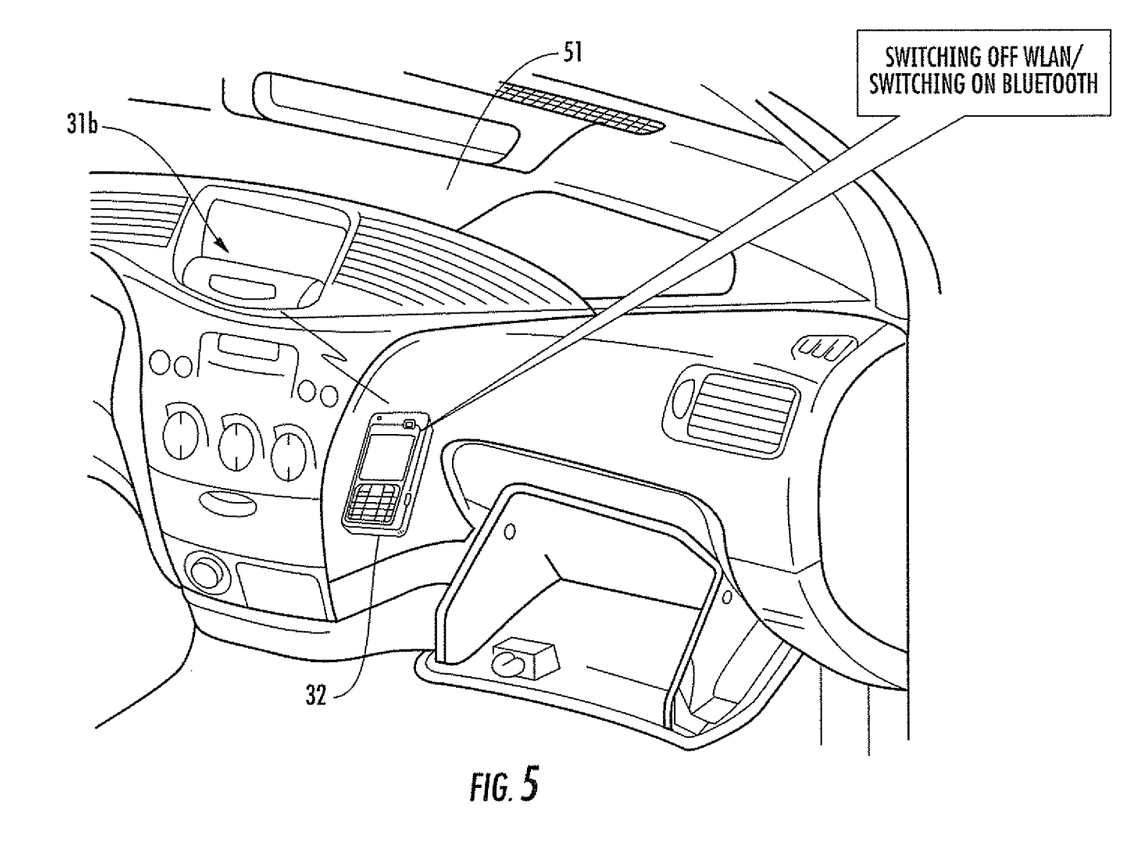
FIG. 5 is a schematic block diagram illustrating use of the NFC system of FIG. 1 with respect to a vehicle.

In accordance with another advantageous example illustrated in FIG. 5, the NFC sensor 31b is positioned within a dashboard 51 of a vehicle, although in other embodiments this (or other) NFC sensors may be located elsewhere (e.g., in the door, seat, etc.). The controller 35 may thus advantageously be configured to switch off powering of the WLAN circuit 38, for example. That is, in contrast to the situation described above with reference to FIG. 4 where cellular communications were not required when in a building 44 where WiFi coverage is available, here the WLAN circuit 38 will be of no benefit when in a moving vehicle out of WLAN coverage, and thus switching off of the WLAN circuit is appropriate to save battery power. Conversely, Bluetooth or cellular communications may now be appropriate for hands-free calling, etc., in the vehicle, and thus the controller 35 may also be configured to switch on powering of the Bluetooth circuit 39 or cellular communication circuit 37.

In accordance with another advantageous aspect, where multiple mobile devices 32 are used, it may be appropriate to selectively change the power usage mode of one device not only based upon whether a given mobile device has established NFC communications with an NFC sensor 31, but also based upon whether another mobile device has already swiped the same sensor. Continuing with the vehicle example of FIG. 5, if two different users enter the vehicle each with a respective mobile device 32 and both "swipe" their mobile devices to the NFC sensor 31*b*, the controller 35 for the first mobile device may cause the Bluetooth circuit 39 thereof to be switched on for hands-free communication. However, when the second mobile device 32 is subsequently swiped, the controller 35 of this mobile device may recognize (e.g., through communications with a vehicle controller via the NFC sensor 31*b*) that the first mobile device is already registered to communicate over the Bluetooth link. As such, to avoid conflicts, the Bluetooth circuit 39 of the second mobile device 32 may accordingly be switched off (or left off if already off) by its controller 35, whereas this Bluetooth circuit would otherwise be switched on but for the first mobile device having enabled its Bluetooth circuit earlier. One or both of the mobile devices 32 may be swiped a second time to change power consumption modes again (e.g., switching off Bluetooth, etc.), such as upon exiting the vehicle, for example. This may also be done when exiting a building or other location where an NFC sensor 31 is initially swiped to indicate entry into the location.

In some embodiments, various power consumption modes may be associated with selectively changing different illumination settings of the display 40. For example, in the embodiments of FIG. 3 or 4, when the NFC sensor 31*a* is swiped, this indicates that the user 45, and thus the mobile device 32, are about to enter the building 44, where there will typically be fluorescent or other indoor lighting. As such, a particular type of lighting or color scheme may be desired in such lighting conditions, as opposed to outdoors where there may be bright sunshine, etc., and a different illumination level or color scheme is desired. By having the appropriate illumination setting changed by the controller 35 upon swiping of the NFC sensor 31*a*, for example, this advantageously makes changing to the appropriate illumination setting "automatic" for the user without having to manually switch to a desired setting each time the building 44, etc., is entered.

Example components of a mobile wireless communications device 1000 that may be used in accordance with the above-described embodiments are further described below with reference to FIG. 7. The device 1000 illustratively includes a housing 1200, a keypad or keyboard 1400 and an output device 1600. The output device shown is a display 1600, which may comprise a full graphic LCD. Other types of output devices may alternatively be utilized. A processing device 1800 is contained within the housing 1200 and is coupled between the keyboard 1400 and the display 1600. The processing device 1800 controls the operation of the display 1600, as well as the overall operation of the mobile device 1000, in response to actuation of keys on the keyboard 1400.

The housing 1200 may be elongated vertically, or may take on other sizes and shapes (including clamshell housing structures). The keyboard may include a mode selection key, or other hardware or software for switching between text entry and telephony entry.

Figure 7:
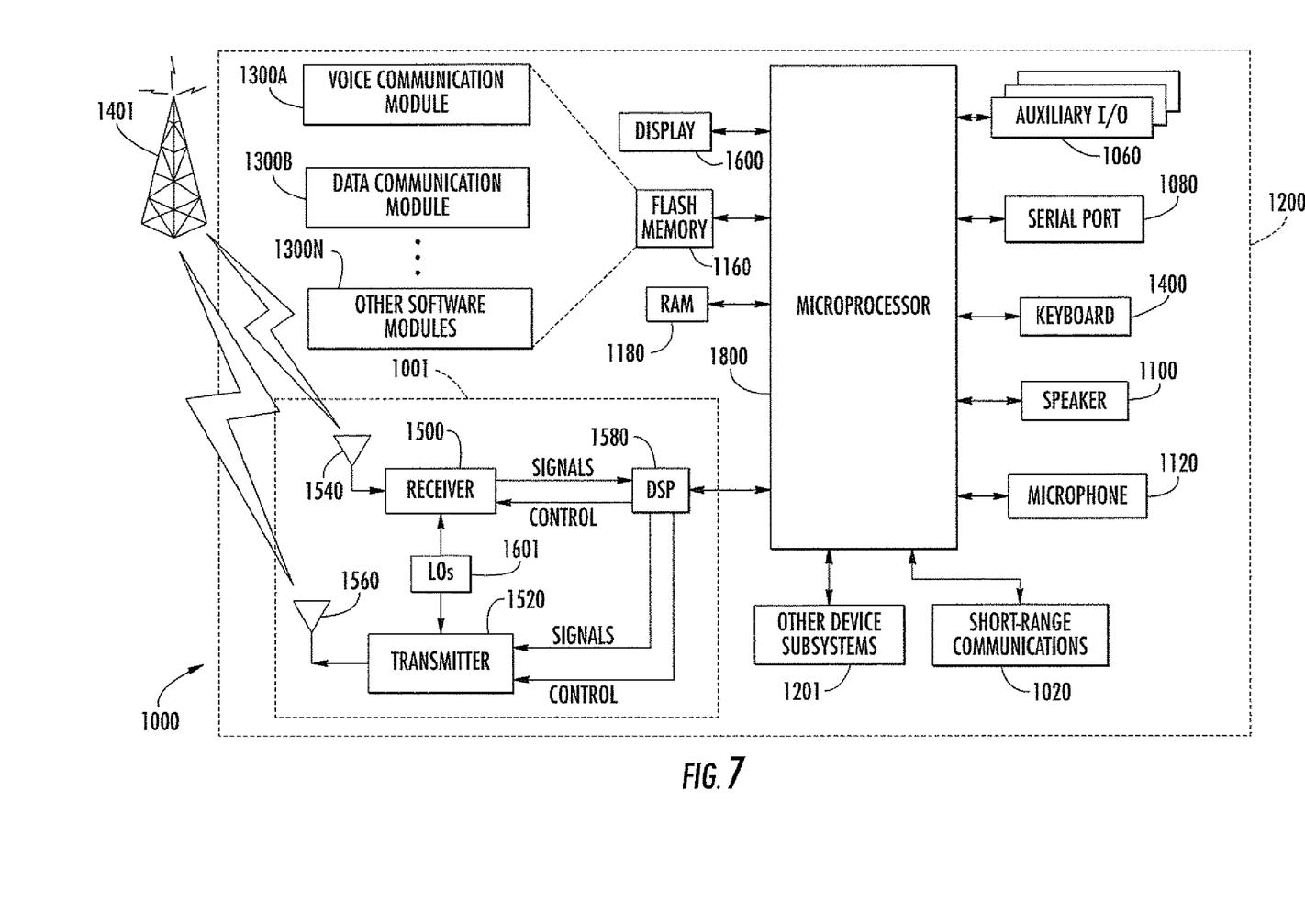
FIG. 7 is a schematic block diagram illustrating example components which may used in the mobile wireless communications devices of FIGS. 1 and 2.

In addition to the processing device 1800, other parts of the mobile device 1000 are shown schematically in FIG. 7. These include a communications subsystem 1001; a short-range communications subsystem 1020; the keyboard 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keyboard 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem 1020 may include an infrared device and associated circuits and components, NFC or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A communication system comprising:
a plurality of near-field communication (NFC) sensors each associated with a respective location and storing information regarding a wireless communication format available at the respective location; and
at least one mobile wireless communications device being switchable among a plurality of different power consumption modes, said at least one mobile wireless communications device comprising
a portable housing,
an NFC circuit carried by said portable housing and configured to establish NFC communications with at least one of said plurality of NFC sensors when in proximity therewith,
a plurality of different wireless communications circuits carried by said portable housing, and
a controller carried by said portable housing and coupled to said NFC circuit and said plurality of different wireless communications circuits, said controller configured to switch to a given power consumption mode based upon establishing NFC communication with the at least one NFC sensor and also based upon whether another mobile device has previously established NFC communication with the at least one NFC sensor, and determining the wireless communications format available at the respective location,
wherein at least some of the different power consumption modes are associated with selectively powering at least one of said plurality of wireless communications circuits and not powering at least one other of said plurality of wireless communications circuits.

2. The communication system of claim 1 wherein said plurality of different wireless communications circuits comprises at least two of a satellite positioning system circuit, a cellular communication circuit, a wireless local area network (WLAN) circuit, and a Bluetooth circuit.

3. The communication system of claim 1 wherein at least one of said plurality of different wireless communications circuits comprises a satellite positioning system circuit.

4. The communication system of claim 3 wherein the location for said at least one NFC sensor is adjacent a building entrance; and wherein said controller is configured to switch off powering of said satellite positioning system circuit.

5. The communication system of claim 1 wherein at least one of said plurality of wireless communications circuits comprises a cellular communication circuit.

6. The communication system of claim 5 wherein the location of said at least one NFC sensor is adjacent a building entrance; and wherein said controller is configured to switch off powering said cellular communication circuit.

7. The communication system of claim 1 wherein at least one of said plurality of wireless communications circuits comprises a wireless local area network (WLAN) circuit.

8. The communication system of claim 7 wherein the location of said at least one NEC sensor is in a vehicle; and wherein said controller is configured to switch off powering of said WLAN circuit.

9. The communication system of claim 1 wherein at least one of said plurality of wireless communications circuits comprises a Bluetooth circuit.

10. The communication system of claim 9 wherein the location of said at least one NFC sensor is in a vehicle; and wherein said controller is configured to switch on powering of said Bluetooth circuit.

11. The communication system of claim 1 wherein said at least one mobile wireless communications device further comprises a display carried by said portable housing and coupled to said controller and having different illumination settings; and wherein at least some of the different power consumption modes are associated with selectively changing the different illumination settings of said display.

12. A mobile wireless communications device for use with a plurality of near-field communication (NFC) sensors each associated with a respective location and storing information regarding a wireless communication format available at the respective location, the mobile wireless communications device being switchable among a plurality of different power consumption modes, the mobile wireless communications device comprising:
- a portable housing;
- an NFC circuit carried by said portable housing and configured to establish NFC communications with at least one of the plurality of NFC sensors when in proximity therewith;
- a plurality of different wireless communications circuits carried by said portable housing; and
- a controller carried by said portable housing and coupled to said NFC circuit and said plurality of different wireless communications circuits, said controller configured to switch to a given power consumption mode based upon establishing NFC communication with the at least one NEC sensor and also based upon whether another mobile device has previously established NFC communication with the at least one NFC sensor, and determining the wireless communications format available at the respective location;
- wherein at least some of the different power consumption modes are associated with selectively powering at least one of said plurality of wireless communications circuits and not powering at least one other of said plurality of wireless communications circuits.

13. The mobile wireless communications device of claim 12 wherein said plurality of different wireless communications circuits comprises at least two of a satellite positioning system circuit, a cellular communication circuit, a wireless local area network (WLAN) circuit, and a Bluetooth circuit.

14. The mobile wireless communications device of claim 12 wherein at least one of said plurality of different wireless communications circuits comprises a satellite positioning system circuit; wherein the location for the at least one NFC sensor is adjacent a building entrance; and wherein said controller is configured to switch off powering of said satellite positioning system circuit.

15. The mobile wireless communications device of claim 12 wherein at least one of said plurality of wireless communications circuits comprises a cellular communication circuit; wherein the location of the at least one NFC sensor is adjacent a building entrance; and wherein said controller is configured to switch off powering said cellular communication circuit.

16. The mobile wireless communications device of claim 12 wherein at least one of said plurality of wireless communications circuits comprises a wireless local area network (WLAN) circuit; wherein the location of the at least one NFC sensor is in a vehicle; and wherein said controller is configured to switch off powering of said WLAN circuit.

17. The mobile wireless communications device of claim 12 wherein at least one of said plurality of wireless communications circuits comprises a Bluetooth circuit; wherein the location of the at least one NFC sensor is in a vehicle; and wherein said controller is configured to switch on powering of said Bluetooth circuit.

18. The mobile wireless communications device of claim 12 further comprising a display carried by said portable housing and coupled to said controller and having different illumination settings; and wherein at least some of the different power consumption modes are associated with selectively changing the different illumination settings of said display.

19. A method for switching power consumption modes of a mobile wireless communications device comprising a portable housing, a near-field communication (NFC) circuit carried by the portable housing and configured to establish NFC communications with at least one of a plurality of NFC sensors each associated with a respective location when in proximity therewith, each NFC sensor storing information regarding a wireless communication format available at the respective location, and a plurality of different wireless communications circuits carried by the portable housing, the method comprising:
- switching the mobile wireless communications device to a given power consumption mode based upon establishing NFC communication with the at least one NFC sensor and also based upon whether another mobile device has previously established NFC communication with the at least one NFC sensor, and determining the wireless communications format available at the respective location;
- wherein at least some of the different power consumption modes are associated with selectively powering at least one of the plurality of wireless communications circuits and not powering at least one other of the plurality of wireless communications circuits.

20. The method of claim 19 wherein at least one of the plurality of different wireless communications circuits comprises a satellite positioning system circuit; wherein the location for the at least one NFC sensor is adjacent a building entrance; and wherein switching comprises switching off powering of the satellite positioning system circuit.

21. The method of claim 19 wherein at least one of the plurality of wireless communications circuits comprises a cellular communication circuit; wherein the location of the at least one NFC sensor is adjacent a building entrance; and wherein switching comprises switching off powering the cellular communication circuit.

22. The method of claim 19 wherein at least one of the plurality of wireless communications circuits comprises a wireless local area network (WLAN) circuit; wherein the location of the at least one NFC sensor is in a vehicle; and wherein switching comprises switching off powering of the WLAN circuit.

23. The method of claim 19 wherein at least one of the plurality of wireless communications circuits comprises a Bluetooth circuit; wherein the location of the at least one NFC sensor is in a vehicle; and wherein switching comprises switching on powering of the Bluetooth circuit.

24. The method of claim 19 wherein the mobile wireless communications device further comprises a display carried by the portable housing and coupled to the controller and having different illumination settings; and wherein at least some of the different power consumption modes are associated with selectively changing the different illumination settings of the display.

* * * * *